S. ALUNAN.
HAND PLOW.
APPLICATION FILED FEB. 19, 1914.
1,125,435.
Patented Jan. 19, 1915.
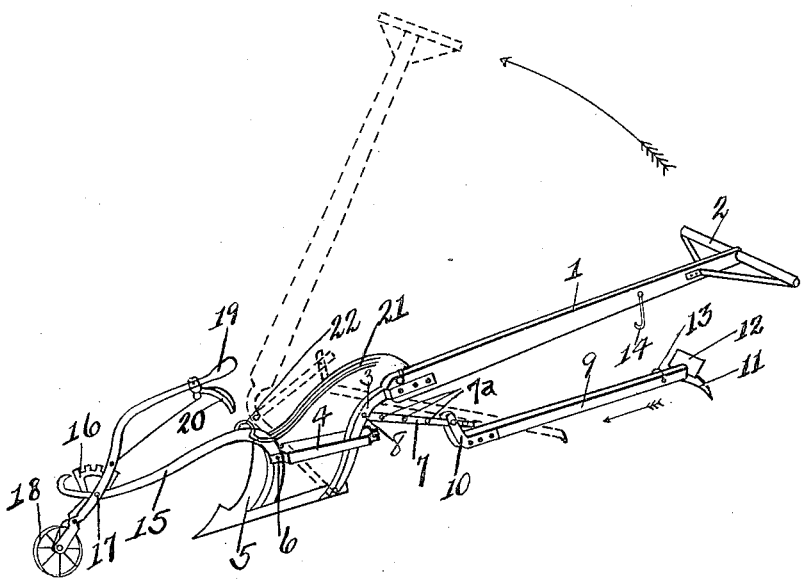
Witnesses
L. A. Williams
W. H. DeLacy
Inventor
Salvador Alunan,
By Geo. P. Kimmel,
Attorney

UNITED STATES PATENT OFFICE.

SALVADOR ALUNAN, OF JARO, PHILIPPINE ISLANDS.

HAND-PLOW.

1,125,435. Specification of Letters Patent. Patented Jan. 19, 1915.

Application filed February 19, 1914. Serial No. 819,854.

*To all whom it may concern:*

Be it known that I, SALVADOR ALUNAN, a citizen of the Philippine Islands, residing at Jaro, in the Province of Iloilo, Philippine Islands, have invented certain new and useful Improvements in Hand-Plows, of which the following is a specification.

This invention relates to improvements in cultivating devices, and more specifically to hand plows.

The object of my invention is to provide a device for mowing or for plowing and cultivating the soil, which, in addition to its simplicity of construction, is extremely durable, and adaptable to a far greater variety of uses than a former invention made by me involving the same principle herein involved, for which said invention an application for patent is now pending, reference being had to application No. 801,432. It is made as light as possible so that one man may readily handle and operate it, there being no side wheels to impede its progress no matter what the character of work being performed. While my previously invented automatic plow is designed primarily for heavy work in plowing open fields, this invention is especially useful in cultivating growing plants.

Other objects of this invention, not at this time more particularly enumerated, will be clearly understood from the detailed description and drawing forming a part of this specification.

With the above and other objects in view, my invention consists in the combination, arrangement, and details of construction disclosed in the drawing and specifications, and then, more particularly pointed out in the appended claims.

Referring now to the drawings which form a part of this specification: the figure is a perspective view of my device, showing the relative position of the parts when handle is in lowered position.

Referring further to the drawings which are merely illustrative of my invention and wherein similar reference characters designate similar parts, 1 designates a lever provided at its free end with a reinforced handle 2 arranged transversely thereof; and a member 3 secured at its opposite end extends downwardly at an oblique angle with respect to said lever and forms a continuation thereof and being pivotally mounted on the plow, operates forward and backward within a guide member 4 which extends rearwardly from a convenient point upon a plow 5, or other agricultural implement, to which said guide member 5 is secured at 6. A stroke regulating rod 7 extending rearwardly, is secured at 8 between member 3, said rod being provided with a plurality of holes 7ª in any of which the anchor rod 9 may be pivotally mounted by means of a pivot pin passing through the bifurcated carrier 10 thereof and through any one of the aforementioned holes. An earth engaging prong 11 extends downwardly from the free end of said anchor rod, the depth to which said prong 11 enters the earth being regulated by a board 12 fixed thereto at a certain distance from the end of said prong and transversely thereof. At a convenient point upon said anchor rod is located a ring 13; a coöperating hook 14 secured to the lever permits of the former being engaged by the latter when lever is extremely lowered thus enabling the operator to raise the anchor rod off the ground when desired. At a certain distance from the free end of the plow-beam 15 is mounted a sector ratchet 16, beneath which is pivotally mounted at 17 a furrow regulating wheel 18. The carrier for said furrow regulating wheel extends upwardly and rearwardly terminating in a handle 19 with which a small lever 20 coöperates to engage and disengage a catch-and-ratchet clutch with said sector ratchet 16. An S-shaped bifurcated rod 21 is pivotally mounted at the forward end of the lever 1, said bifurcated rod being united at its free end by a half-oval portion 22, which portion 22 rests upon the plow-beam 15 in such manner that the part of bifurcated rod 21 contiguous therewith will slidably engage the sides of the said plow-beam, thus tending to maintain the respective parts of my device in alinement during operation. This cultivating device is operated by an upwardly and downwardly movement of the lever 1. The operator first raises the lever upwardly, which movement causes the same to move forward within guide member 3, and the anchor rod 9 to automatically swing forward upon its pivotal bearing. The lever is then pressed downwardly, causing the pronged member 11 to become firmly anchored in the earth whereby the continued downward pressure upon said lever will cause said plow to move forwardly through the earth. The progress of the plow forward at each stroke of the lever will be regulated not only by the distance to which lever is moved upwardly and downwardly, but also by the position of anchor rod 9 with respect to stroke regulating rod 7; the further forward the said rod is mounted, the longer the stroke will be, and vice versa, the further back the anchor rod is mounted upon said stroke regulating rod, the shorter the forward movement of the plow will be.

Having now described and pointed out the new and useful features of my invention, I do not limit myself to the shape of certain parts where the shape is not essential, nor do I restrict myself to the exact details of construction shown and described, but mean and intend to claim all equivalents and variations thereof not departing in principle from my invention and falling within the purview of the appended claims.

What I claim as my invention and desire to protect by Letters Patent is:

1. In a device of the kind described in combination a plow, a lever pivotally mounted at one end to the landslide of said plow, a guide member for said lever mounted on the plow-beam of said plow, and an anchor rod mounted at one end on said lever adapted to move forwardly when said lever is raised.

2. In combination a plow, a lever pivotally mounted at one end to the landslide of said plow, a bifurcated member pivotally mounted at one end to said lever and adapted to slide upon the plow-beam of said plow, and an anchor rod pivoted on one end of the end of the rod 7, the other end of the rod being pivoted to said lever.

3. In combination a plow, a lever pivotally mounted upon said plow, a guide member mounted at one end on the plow-beam of said plow, said lever adapted to move within said guide member, a bifurcated rod pivotally mounted at one end to said lever and adapted to slide upon the plow-beam of said plow, and an anchor rod mounted at one end to said lever adapted to move forwardly when said lever is raised.

In testimony whereof I affix my signature in presence of two witnesses.

SALVADOR ALUNAN.

Witnesses:
 IVIS TIONGRO,
 PEDRO MORALES.

Copies of this patent may be obtained for five cents each, by addressing the "Commissioner of Patents, Washington, D. C."